United States Patent
Bauernfeind et al.

(10) Patent No.: US 11,628,757 B2
(45) Date of Patent: Apr. 18, 2023

(54) ADJUSTABLE ASSEMBLY FOR A VEHICLE WITH A PIVOTABLE TABLE ELEMENT

(71) Applicant: Brose Fahrzeugteile SE & Co. Kommanditgesellschaft, Coburg, Coburg (DE)

(72) Inventors: Markus Bauernfeind, Coburg (DE); Michael Höppel, Bad Staffelstein (DE); Fabian Lang, Ergersheim (DE)

(73) Assignee: Brose Fahrzeugteile SE & Co. Kommanditgesellschaft, Coburg

( * ) Notice: Subject to any disclaimer, the term of this patent is extended or adjusted under 35 U.S.C. 154(b) by 0 days.

(21) Appl. No.: 17/261,472

(22) PCT Filed: Jul. 2, 2019

(86) PCT No.: PCT/EP2019/067734
§ 371 (c)(1),
(2) Date: Jan. 19, 2021

(87) PCT Pub. No.: WO2020/016000
PCT Pub. Date: Jan. 23, 2020

(65) Prior Publication Data
US 2021/0253010 A1 Aug. 19, 2021

(30) Foreign Application Priority Data
Jul. 19, 2018 (DE) ............ 10 2018 212 085.4

(51) Int. Cl.
*B60N 3/00* (2006.01)
(52) U.S. Cl.
CPC .................. *B60N 3/002* (2013.01)

(58) Field of Classification Search
CPC ......... B60N 3/002; B60N 3/004; A47B 5/00; A47B 5/006; A47B 3/04; A47B 3/10; A47B 31/06
USPC ............ 108/20, 44, 67, 68, 33, 34; 297/143, 297/144, 145, 151, 154, 162
See application file for complete search history.

(56) References Cited

U.S. PATENT DOCUMENTS

| | | | | |
|---|---|---|---|---|
| 1,566,200 A | * | 12/1925 | Giard | A47B 3/04 |
| | | | | 108/68 |
| 2,726,911 A | * | 12/1955 | Mason | A47B 1/06 |
| | | | | 312/297 |
| 2,869,956 A | * | 1/1959 | Gaines | A47B 83/045 |
| | | | | 312/297 |

(Continued)

FOREIGN PATENT DOCUMENTS

| | | |
|---|---|---|
| DE | 3624156 C1 | 11/1978 |
| DE | 3723027 C1 | 9/1988 |

(Continued)

*Primary Examiner* — Jose V Chen
(74) *Attorney, Agent, or Firm* — Dickinson Wright PLLC (57) ABSTRACT

An adjustable assembly for use in a vehicle, including a table element and an adjustment device for power-operated adjustment of the table element. The table element defines a table surface on which at least one object can be deposited. The table element is adjustable in a power-operated way by means of the adjustment device along a longitudinal axis extending substantially parallel to the table surface between a retracted position and an extended position and is pivotable about a pivot axis extending substantially perpendicularly to the longitudinal axis.

19 Claims, 9 Drawing Sheets

(56) References Cited

U.S. PATENT DOCUMENTS

| | | | | |
|---|---|---|---|---|
| 3,464,303 A * | 9/1969 | Rudolf | A47B 5/04 | 108/73 |
| 4,829,910 A * | 5/1989 | Lirette | A47B 83/045 | 108/35 |
| 4,944,552 A * | 7/1990 | Harris | B64D 11/0638 | 297/145 |
| 5,597,199 A * | 1/1997 | Hoffman | A47B 85/00 | 297/188.1 |
| 7,836,832 B2 * | 11/2010 | Boyd | A47B 5/00 | 312/297 |
| 7,963,231 B2 * | 6/2011 | Osborne | A47B 5/006 | 108/42 |
| 8,205,563 B2 * | 6/2012 | St. Louis | B64D 11/0638 | 108/42 |
| 8,272,334 B2 * | 9/2012 | Wang | G05G 11/00 | 108/143 |
| 8,579,151 B2 * | 11/2013 | Kodama | B60R 7/04 | 312/297 |
| 9,955,779 B2 * | 5/2018 | Hoeftberger | B60N 3/004 | |
| 10,070,717 B2 * | 9/2018 | De Saulles | A47B 31/06 | |
| 2003/0047120 A1 * | 3/2003 | Dettmers | A47B 9/16 | 108/42 |
| 2003/0188672 A1 * | 10/2003 | Parent | A47B 5/006 | 108/134 |
| 2007/0227407 A1 * | 10/2007 | Cartensen | B61D 37/006 | 108/33 |
| 2009/0026812 A1 * | 1/2009 | Figueras Mitjans | A47C 7/624 | 297/162 |
| 2010/0175592 A1 * | 7/2010 | Looser | A47B 27/02 | 108/2 |
| 2012/0133254 A1 * | 5/2012 | Chupp | A47B 1/06 | 312/205 |
| 2012/0312198 A1 * | 12/2012 | Henderson | B60N 3/002 | 108/44 |
| 2013/0199420 A1 * | 8/2013 | Hjelm | A47B 21/00 | 108/50.11 |
| 2014/0252811 A1 * | 9/2014 | Whalen | B60N 3/002 | 297/173 |
| 2017/0001517 A1 * | 1/2017 | Herrmann | B60K 15/05 | |

FOREIGN PATENT DOCUMENTS

| | | |
|---|---|---|
| DE | 29908621 U1 | 9/1999 |
| DE | 102014003023 A1 | 9/2015 |
| DE | 102016123510 A1 | 6/2017 |
| DE | 102017201626 A1 | 8/2018 |
| DE | 102018201004 A1 | 7/2019 |
| EP | 2213510 A1 | 8/2010 |
| FR | 2802070 A1 | 6/2001 |
| GB | 2525380 A | 10/2015 |
| WO | 2016164953 A1 | 10/2016 |

* cited by examiner

ADJUSTABLE ASSEMBLY FOR A VEHICLE WITH A PIVOTABLE TABLE ELEMENT

CROSS-REFERENCE TO RELATED APPLICATIONS

This application is the U.S. National Phase of PCT Application No. PCT/EP2019/067734 filed on Jul. 2, 2019, which claims priority to German Patent Application No. DE 10 2018 212 085.4, filed on Jul. 19, 2018, the disclosures of which are hereby incorporated in their entirety by reference herein.

TECHNICAL FIELD

The present disclosure relates to an adjustable assembly, including a table element and an adjustment device, for use in a vehicle.

BACKGROUND

Table elements for providing a usually flat table surface in a vehicle are widely known, in particular in the area of so-called vans. To increase comfort, such table elements are often mounted on a dashboard or a front seat of the vehicle for a power-operated adjustment. However, the functionality of such a table element adjustable in a power-operated way is regularly limited. Often, comparatively complex adjustment mechanisms are also provided in order to realize an adjustment of the table element along exactly one specified adjustment path.

SUMMARY

One or more objects of the present disclosure may be to provide an adjustable assembly with a table element, which allows an improved utilization of a table element and possibly represents an added value for the vehicle occupant, for example under safety aspects.

According to a first embodiment, there is proposed an adjustable assembly for a vehicle with a table element and an adjustment device for the power-operated adjustment of the table element, in which the table element defines a table surface on which at least one object can be deposited. The table element is adjustable in a power-operated way by means of the adjustment device along a longitudinal axis extending substantially parallel to the table surface between a retracted position and an extended position and also is pivotable about a pivot axis extending substantially perpendicularly to the longitudinal axis.

By means of the power-operated adjustment along the longitudinal direction, the size of the provided table surface can be varied between a fully retracted and a fully extended position, depending on the adjustment position of the table element. Moreover, the additionally provided pivotability of the table element allows to vary the inclination desired by the user of the table element—if necessary within a predefined pivot angle range. The longitudinal axis extending substantially parallel to the table surface (in a fully retracted position) also includes such a longitudinal axis which is inclined by up to 15% relative to the table surface to be extended or retracted, respectively.

In the present case, a power-operated adjustment along this longitudinal axis between a retracted position and an extended position may refer to the fact that the table element is adjustable in a power-operated way from the retracted position into an extended exposition and/or from an extended position into the retracted position. As an example, this accordingly should include the fact that via the adjustment device the table element in one design variant only is adjustable in a power-operated way in one of two possible adjustment directions along the longitudinal axis and is manually adjustable in the other adjustment direction.

In one design variant, a physical guideway is provided by the adjustment device for the adjustment of the table element along the longitudinal axis. Such physical guideway for example can be provided by at least one slotted guide and/or one guide rail of the adjustment device. Thus, the table element is selectively guided along a component of the adjustment device defining the physical guideway, for example to move from a retracted position to an extended position. In one design variant it is provided for example that the table element can be adjusted to a plurality of different extended (adjustment) positions within an adjustment range defined between a fully retracted position and a fully extended position. Depending on the adjustment position of the table element, and thus depending on how far the table element is extended along the longitudinal axis with respect to the fully retracted position, the size of the table surface defined by the table element and provided for depositing an object is different. The size of the table surface usable for depositing an object thus varies in dependence on an adjustment position of the table element along the longitudinal axis.

In one design variant, the table surface of the table element is at least partly defined by an adjustable cover, which is adjustable between a closed position and at least one open position. In the at least one open position of the cover, a storage space of the table element is made accessible. Thus, this storage space is located inside the table element and is closed by the cover in the (fully) closed position of the cover. As an example, the storage space can be provided in a storage compartment body of the table element which extends and retracts with the table element, so that a storage space of the table element is adjustable in a power-operated way via the adjustment device. By adjusting the cover, for example, the available table surface is reduced, but at the same time a storage space underneath the cover is made accessible. Such a table element provided with a storage space thus can replace a conventional glove compartment in the dashboard of a motor vehicle, for example.

To increase comfort, for example, it can be provided that the adjustment device also permits a manual adjustment of the table element as an alternative to a power-operated adjustment of the table element. By means of a permitted manual adjustment of the table element, a faster adjustment of the table element by a user can become possible as compared to a power-operated adjustment. If necessary, the user for example can quickly extend or retract the table element manually, but then or as an alternative also can extend and/or retract the table element in a power-operated way.

For a power-operated adjustment, the adjustment device comprises at least one motorized drive unit. As an example, an electromotive drive unit possibly can be provided in combination with an integrated transmission device.

For an adjustment device which permits a manual adjustment of the table element as an alternative to a power-operated adjustment of the table element, it can be provided, for example, that the adjustment device of the adjustable assembly comprises at least one clutch via which the at least one motorized drive unit can be disengaged. By disengaging the motorized drive unit with the aid of the at least one clutch, a manual adjustment of the table element thus can selectively be permitted.

Alternatively or in addition, the at least one motorized drive unit can be non-self-locking to permit a manual adjustment of the table element at standstill of the at least one motorized drive unit.

In a design variant of a proposed adjustable assembly, in which the adjustment device includes at least one clutch, the clutch for example can comprise a slip clutch which in case of overload allows an adjustment of the table element without activating the motorized drive unit. Consequently, when a force applied from outside onto the table element, which exceeds a defined threshold value, acts on the table element, the slip clutch decouples the table element from the motorized drive unit and hence permits a manual adjustment of the table element. In this way, a damage of the motorized drive unit can be avoided.

A disengagement of the motorized drive unit, which is possible in a case of overload, is also advantageous for example in a crash case in order to avoid or at least reduce an injury to a vehicle occupant by bumping against the table element. In this way, the slip clutch can selectively release the table element in the event of a crash and provide for its adjustment, such as retraction and/or folding away, when an increased force exceeding a threshold value acts on the table element, for example by a body part of a user which, in the event of a crash, bumps against the table element at above-average speed and/or acceleration. The adjustment device equipped with a slip clutch or an alternatively designed overload clutch thus allows the table element to be adjusted independently of the motorized drive unit, which is then decoupled or disconnected, in particular in the event of a crash.

In one or more embodiments, for example, it is provided—possibly also in addition to the variants explained above—that there is provided at least one operating element actuatable by a user (for example on the table element itself), which upon actuation provides for a change of the adjustment device from a first operating state to a second operating state and, via the adjustment device, in the first operating state a power-operated adjustment of the table element is permitted and in the second operating state a manual adjustment of the table element is permitted, or vice versa.

By selectively actuating the at least one operating element, the user thus can choose whether the table element should be adjustable manually or in a power-operated way. In a possible development, the change from one operating mode to the other also can depend on the fulfillment of further criteria and hence for example on the presence of additional operating signals at an electronic control unit of the adjustment device. For example, this includes the fact that at least two operating elements are operated at the same time, and may be operated and remain operated at the same time in order to trigger a temporary or permanent change to another operating state. For example, there can be provided two operating elements, such as in the form of sensors and/or at the table element itself, both of which must be operated by a user in order to change to another operating state and to activate or deactivate the disengagement of a motorized drive unit and/or the release of a brake of the adjustment device. For example, the table element can only be adjusted manually as long as the at least one or possibly the at least two operating elements is/are kept actuated.

An operating element in principle can be formed on the table element itself, for example in the form of at least one sensor. By touching or pressing the operating element, an operating signal can be generated for an electronic control unit, by means of which the adjustment device and a motorized drive unit of the adjustment device can be controlled.

For a change from one operating state to another operating state of the adjustment device, at least two operating elements also can have to be actuatable, as already explained above, which must then be actuated one after the other in parallel or simultaneously or at least within a predefined, comparatively short period of time. This will exclude the fact that a change from the one operating state to the other operating state of the adjustment device is effected unintentionally, and hence for example a user sets a power-operated adjustability of the table element or unintentionally triggers a power-operated adjustment of the table element although a manual adjustment of the table element is desired, or alternatively a user unintentionally sets a manual adjustment although a power-operated adjustment of the table element is desired.

In one design variant, the adjustment device of the adjustable assembly comprises at least one lever mechanism for adjusting the table element. By means of a lever mechanism a complex adjustment can be realized with a comparatively low complexity of an adjustment kinematics realized therewith and in an extremely fail-safe way. As an example, a lever mechanism can also be used to easily control a pivotal movement around the pivot axis extending perpendicularly to the longitudinal axis.

In a possible embodiment, the at least one lever mechanism comprises two levers articulated to each other, via which an adjustment force generated by a motor can be transmitted to the table element. At least one of the levers can be configured as a pivot lever, in which a first lever end is rotatable about a drive axis by a motorized drive unit, while a second lever end of the oscillating lever is articulated to the at least one further lever of the lever mechanism.

To avoid jamming of the table element during an adjustment between the retracted position and the extended position, the adjustment device also can provide two lever mechanisms, which each are associated with one long side of the table element. In a design variant comprising two lever mechanisms, a motorized drive unit moreover can be sufficient to transmit adjustment forces to both lever mechanisms. For example, a drive shaft can therefor be rotated by the motorized drive unit, which is coupled to at least one lever of each lever mechanism. For example, one pivot lever of each of the two lever mechanisms is non-rotatably connected to such a drive shaft with one (first) lever end.

The use of a lever mechanism for the adjustment of the table element can also be accompanied by the provision of a physical guideway for the adjustment of the table element along the longitudinal axis. In this connection, for example, a lever of the lever mechanism can be provided with a guide element which is shiftable along a slotted guide and which is connected to the table element. For example, the lever provided with the guide element is that lever which is articulated to a pivot lever, one (first) lever end of which is rotatable about a drive axis by a motorized drive unit of the adjustment device.

In one design variant, two slotted guides can be provided, wherein the guide element provided on one lever is shiftable along a first slotted guide of the two slotted guides, and a second guide element connected to the table element, which is spaced apart from the guide element provided on the one lever, is shiftable along a second slotted guide of the two slotted guides. The different (first and second) guide elements of the first and second slotted guides typically are associated with a long side of the table element so that by means of these two (first and second) guide elements the table element is shiftably guided along both slotted guides and the courses of the two first and second slotted guides jointly specify an adjustment path of the table element from a fully retracted to a fully extended (adjustment) position.

Due to non-parallel courses of the first and second slotted guides, it hence is also possible to specify complex adjusting movements for the table element, and at least one pivotal movement about the pivot axis, which extends substantially perpendicularly to the longitudinal axis. For example, this includes the fact that a portion of the first or second slotted guide specifies an adjustment path for the table element such that when the respective guide element is adjusted along this portion, the table element is forced to perform a pivotal movement about the pivot axis extending substantially perpendicularly to the longitudinal axis, which then is defined by that guide element which is shiftable along the other, second or first slotted guide. The corresponding portion, via which a pivotal movement is forced upon the table element when it is adjusted along the portion of the respective slotted guide, can extend obliquely and for example, at angle to an adjoining portion of the respective slotted guide. A corresponding portion of the other slotted guide, in which the other guide element is present at the same time, correspondingly does not follow the course of the oblique or angled portion so that the table element shiftably mounted on both slotted guides experiences a pivotal movement.

Analogous to the provision of two lever mechanisms each associated with different long sides, a pair of first and second slotted guides also can each be provided on one of two side parts of the adjustable assembly facing each other transversely to the longitudinal axis. Thus, one first slotted guide and one second slotted guide, which is not parallel to the first slotted guide, each are provided on a side part of the adjustable assembly. Between the side parts facing each other, the table element then is at least partly arranged in the retracted position.

In one design variant, the adjustment device comprises at least two motorized drive units, wherein via a first motorized drive unit of the at least two motorized drive units the table element is adjustable along the longitudinal axis in a power-operated way, and via a second motorized drive unit of the at least two motorized drive units the table element is pivotable about the pivot axis. In this variant, different drive units thus are provided for the realization of the different adjusting movements. In this way, an adjustment either along the longitudinal axis or about the pivot axis can be performed by a user not only in dependence on the actuation of the one or other motorized drive unit. Rather, by actuating both motorized drive units, a complex adjustment path can also be easily realized for the intermediate element by superimposing the two adjusting movements.

For example, the first motorized drive unit and the second motorized drive unit each are associated with one of at least two linear guideways of the adjustment device. The at least two linear guideways thus can be superimposed in order to not only retract and extend the table element, but also to vary its inclination with respect to the pivot axis by means of the second motorized drive unit.

For the adjustment along the longitudinal axis, the table element in one possible embodiment is shiftably mounted on at least one first bearing unit of a first linear guideway, with which the first motorized drive unit is associated. Via at least one second bearing unit, this first linear guideway furthermore is shiftable along a second linear guideway of the adjustment device with length compensation or curved guideway (e.g. banana spindle), with which the second motorized drive unit is associated. The first linear guideway thus is shiftable along the second linear guideway by a displacement on the second bearing unit so that the first linear guideway and hence the table element mounted thereon are pivotable about the pivot axis. In this connection it can be provided for example that by adjusting the second bearing unit along the second linear guideway, the table element which is mounted on the first linear guideway via the at least one first bearing unit is pivotable about the pivot axis extending substantially perpendicularly to the longitudinal axis, which is defined by the first bearing unit on the first linear guideway. Thus, the first bearing unit forms the pivot axis for the table element on a stationary component of the adjustment device so that by shifting the second bearing unit on the second linear guideway, a pivotal movement of the table element is possible. For this purpose, the first bearing unit for example can be shiftably mounted in a guide rail and/or can be adjustable by a spindle, cable, belt or rack-and-pinion drive and can be rotatable on a stationary side part of the adjustment device via a protruding pivot pin.

In principle, it can be provided that at least one of the linear guideways comprises a toothed rack, a spindle and/or a guide rail. Via each of the three aforementioned components, a typically linearly or at least substantially linearly extending adjustment path is specified, along which the first bearing unit or the second bearing unit—driven by the respective first or second motorized drive unit—then is adjustable.

According to another embodiment of the proposed solution, which can easily be combined with the design variants explained above according to the first embodiment of the proposed solution, a proposed adjustable assembly comprises an electronic control unit, which is configured to upon receipt of at least one control signal, which is generated in the case of a potential crash of the vehicle, actuate the adjustment device, and/or upon receipt of at least one operating signal, which is generated by actuating an operating element, trigger a change of the adjustment device from a first operating state to a second operating state, wherein in the first operating state a power-operated adjustment of the table element is permitted and in the second operating state a manual adjustment of the table element is permitted, or vice versa.

In the variant first mentioned above an electronic control unit is part of the adjustable assembly, by means of which an actuation of the adjustment device is effected automatically as soon as a potential crash of the vehicle or a crash case is detected by means of sensor. The actuation of the adjustment device in response to the at least one control signal may be based on the actuation of a clutch and/or a motorized drive unit of the adjustment device. As already explained above, it can be achieved for example by activating or deactivating a clutch of the adjustment device that the at least partly extended table element, which correspondingly represents a potential risk of injury to a vehicle occupant in a crash case, can be retracted or folded away without a blocking effect of the drive unit.

An automatic actuation of a motorized drive unit in response to at least one control signal indicating a potential crash case in turn for example can lead to the fact that the table element is automatically adjusted into a fully retracted position in a power-operated way. The risk of injury to a vehicle occupant can likewise be reduced thereby. In this connection, it furthermore can also be provided that a power-operated adjustment of the table element in response to an operating signal of the user is effected at a lower speed than an adjustment of the table element into a (fully) retracted position in response to a control signal which indicates a possible crash case.

Alternatively or in addition, in accordance with the second embodiment of the proposed solution, the electronic control unit can be configured to receive an operating signal and in response thereto perform a change between two different operating states in order for a user to be able to choose between a manual adjustability and a power-operated adjustability of the table element. Design variants and advantages possible in this respect have already been explained above with respect to a corresponding design variant according to the first embodiment of the proposed solution.

According to a third embodiment of the proposed solution, which can easily be combined with the first and/or second embodiment of the proposed solution, an adjustment device of a proposed adjustable assembly comprises a switchable clutch which can be used for different types of adjustment device, wherein at least one type of the possible adjustment device is provided merely for a manual adjustment of the table element. Thus, a proposed adjustable assembly with a corresponding switchable clutch for the power-operated adjustment of the table element also can easily be utilized without a motorized drive unit and thus without any change in the adjustment mechanism for an adjustable assembly comprising an exclusively manually adjustable table element.

For example, this allows to provide a base version for an adjustable assembly comprising an adjustable table element, an adjustment mechanism and a switchable clutch coupled with the adjustment mechanism, which can or cannot be coupled with a motorized drive unit as required, in order to provide at least two different types of adjustment device and hence different adjustable assemblies. For the exclusively manually adjustable (first) version of the adjustable assembly, for example the clutch of the base version then is permanently switched into a clutch state in which the clutch is not self-locking and hence the adjustment mechanism coupled with the clutch is permanently released for manual adjustment. When the clutch additionally is coupled with a motorized drive unit for an alternative (second) version of the adjustable assembly, the clutch can be switched between two clutch states in a mechanically and/or electrically controlled way. In one of the clutch states, an adjusting force for the power-operated adjustment of the table element can then be transmitted from the motorized drive unit to the adjustment mechanism across the clutch. In the other clutch state, on the other hand, the motorized drive unit is decoupled from the adjustment mechanism and a manual adjustment of the table element becomes possible.

In principle and hence independent of whether an adjustable assembly is configured according to the first, second and/or third embodiment, the adjustable assembly comprising the table element and the adjustment device can be configured as a premounted and pretestable module. Hence, this includes the fact that the table element already is adjustably arranged on one or more supporting components of the module, on which the adjustment mechanism and possibly a clutch and/or at least one motorized drive unit are held as well. In this way, the module can be premounted and be tested for functionality, before it is provided for installation in the vehicle or a vehicle component such as for example a vehicle seat or a dashboard.

Regardless of the configuration of the adjustable assembly, a power-operated wall element can be provided thereon, and in particular on the extendable table element (e.g. on a long or front side of the table element), possibly combined with a pivotable floor element, as it is described in DE 10 2018 201 004 A1.

BRIEF DESCRIPTION OF THE DRAWINGS

The attached Figures by way of example illustrate possible design variants of the proposed solution.

In the Drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In DE 10 2017 201 626 A1, it is proposed for example to combine a storage compartment with a table element. The focus of the solution described in this patent application is the provision of a storage compartment which is variably adjustable in its size. A front wall of this storage compartment can, however, also be used as a table element via the proposed adjustment mechanism and the stiffening link chains used therein. The front wall of the storage compartment can be pivoted into a table position when the storage compartment is in an extended position. However, when a table element is required to provide a table surface of variable size depending on the adjustment position of the table element, this cannot be realized in DE 10 2017 201 626 A1. Only the front wall as a whole can always be used as a table element and therefor be pivoted into a table position.

FIGS. 1, 2A-2B, 3A-3D, 4A-4B and 5A-5B show different views of an exemplary embodiment for a proposed adjustable assembly in the form of a prefabricated and pretestable storage compartment module 1. This storage compartment module 1 is to be provided for example on a dashboard of a vehicle or on a backrest of a vehicle seat. The storage compartment module 1 comprises an adjustable table element 2, which on the one hand is adjustable in a power-operated way along a longitudinal axis A between a retracted position corresponding to FIG. 1 and a fully extended position corresponding to FIGS. 3C, 3D, 4A, 4B, 5A and 5B by means of an adjustment device 4 of the storage compartment module 1. In addition, the table element 2 is pivotable about a pivot axis D extending substantially perpendicularly to the longitudinal axis A in order to be able to adjust the extended table element 2 in its inclination, when necessary.

Figure 1:
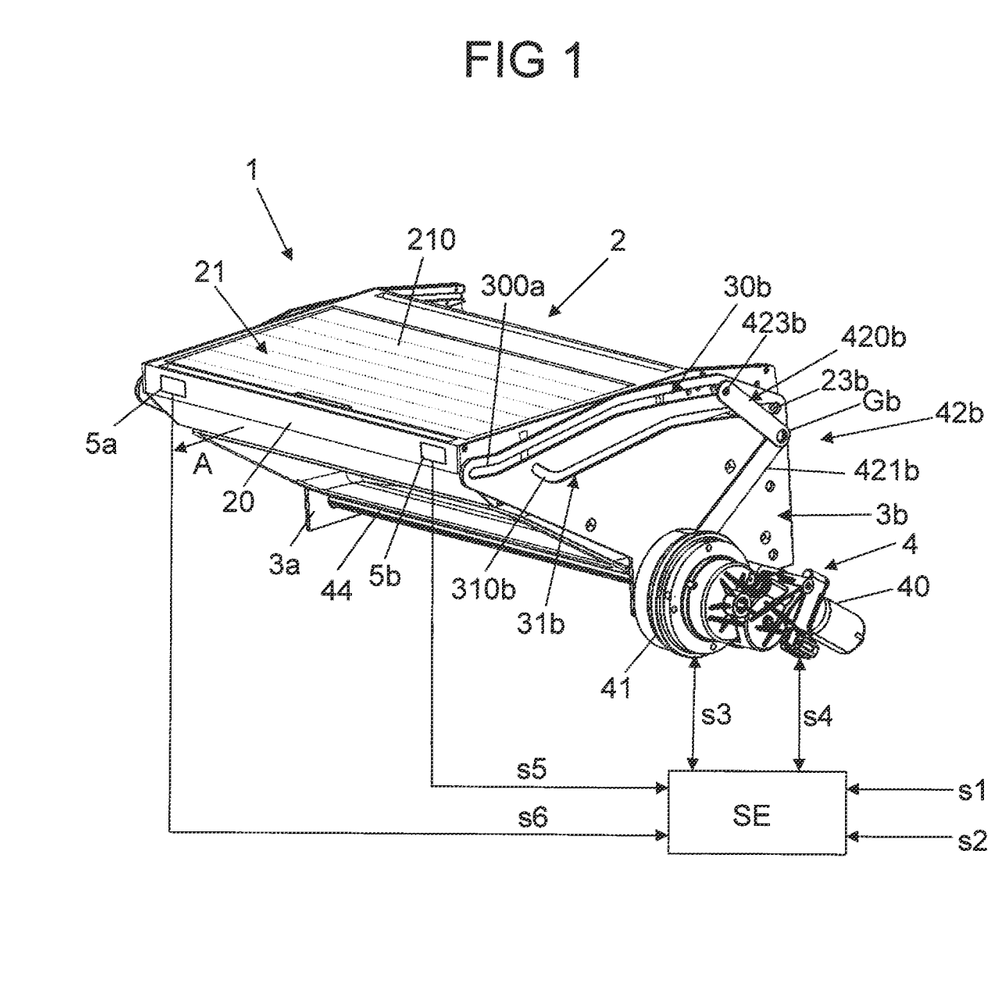
FIG. 1 shows a perspective view of a design variant of a proposed adjustable assembly in the form of a storage compartment module.
Figures 2A, 2B:
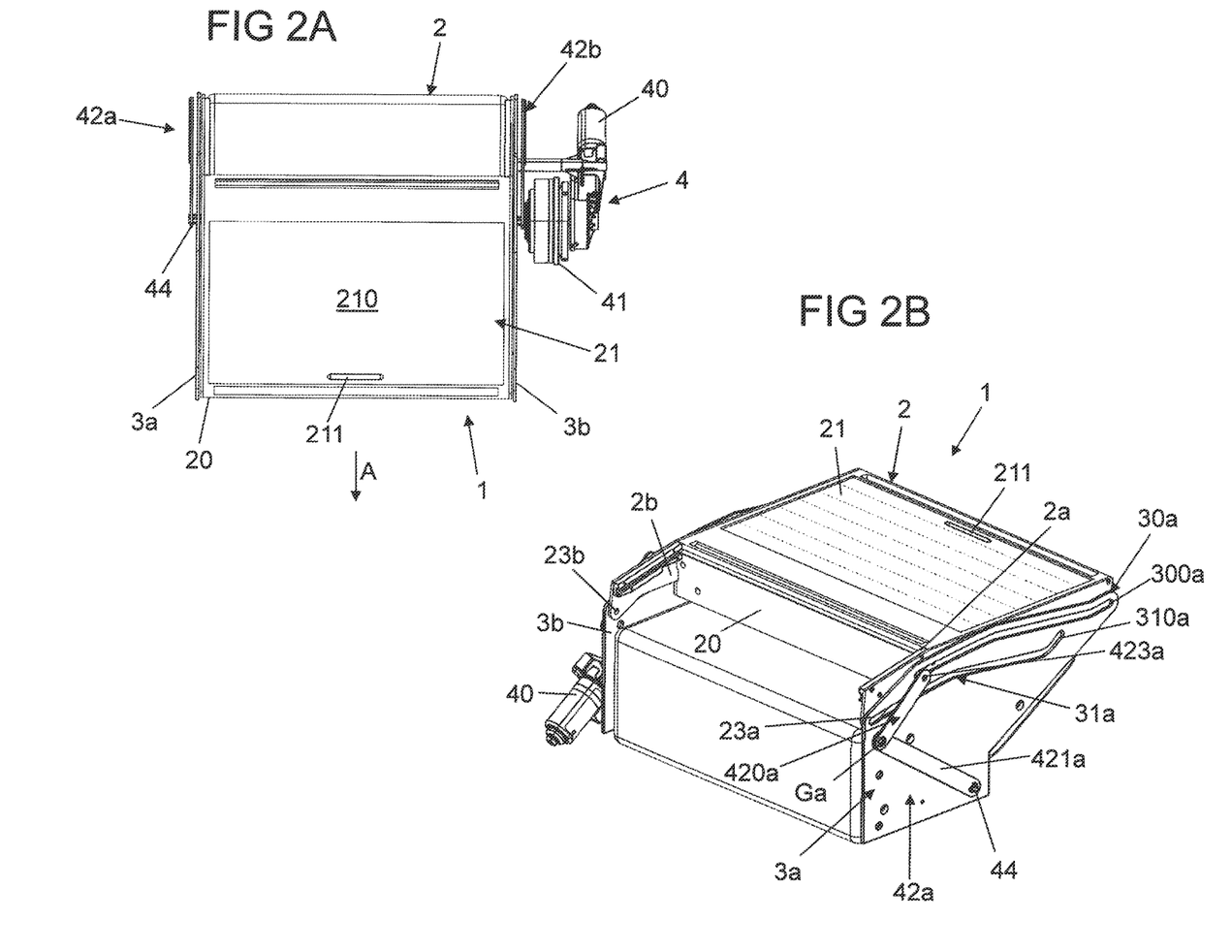
FIGS. 2A-2B show various views of the storage compartment module of FIG. 1.
Figure 3A:
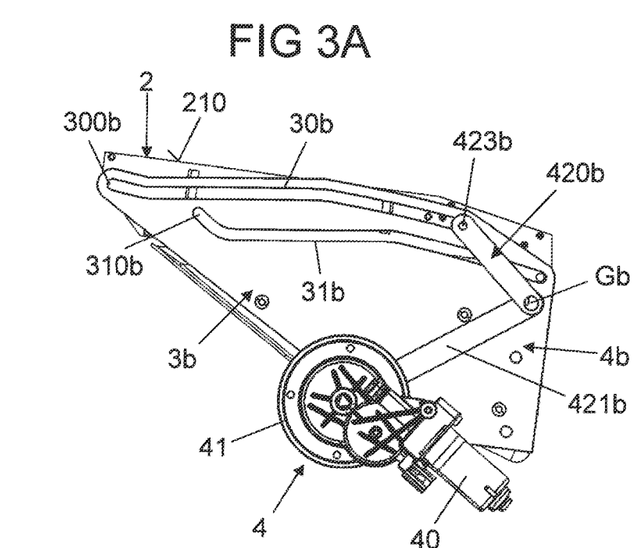
FIGS. 3A-3D show a side view of the storage compartment module of FIGS. 1 and 2A-2B with an adjustable table element of the storage compartment module in different adjustment positions.
Figure 3B:
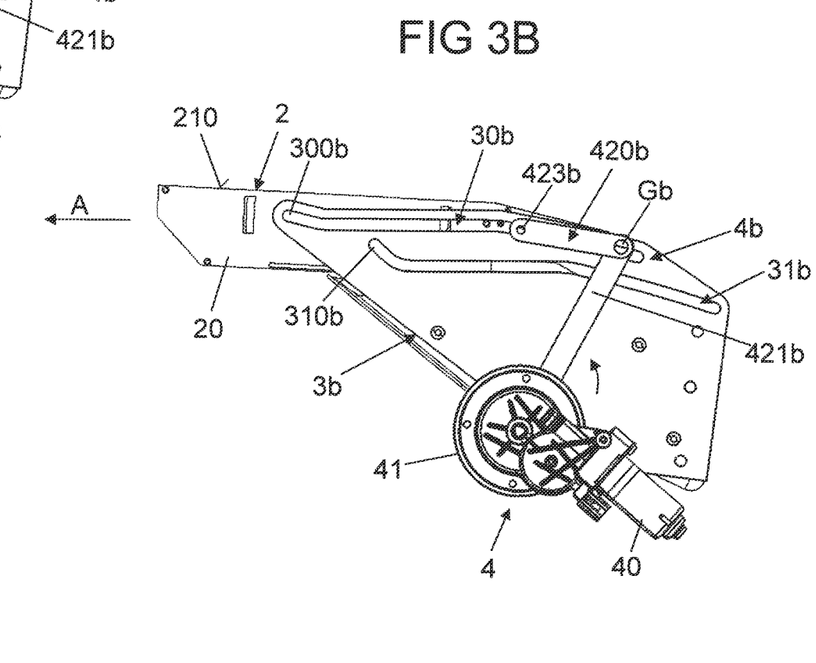
Figure 3C:
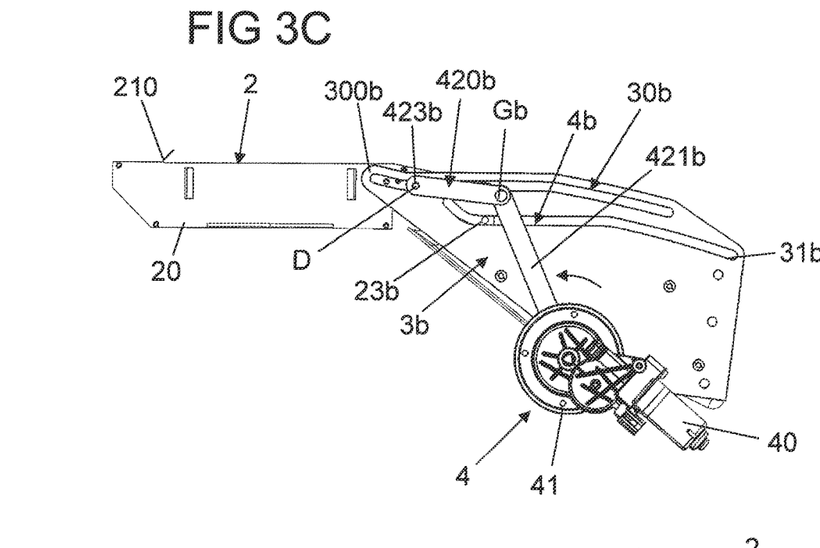
Figure 3D:
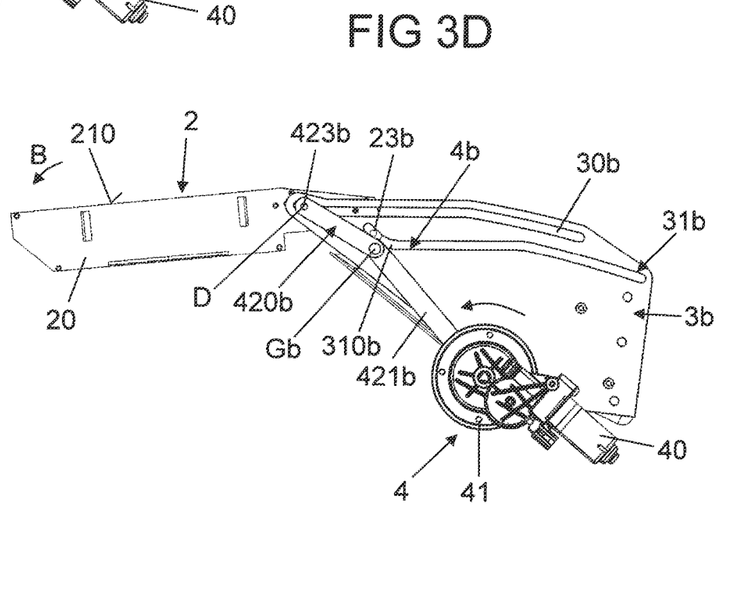
Figures 4A, 4B:
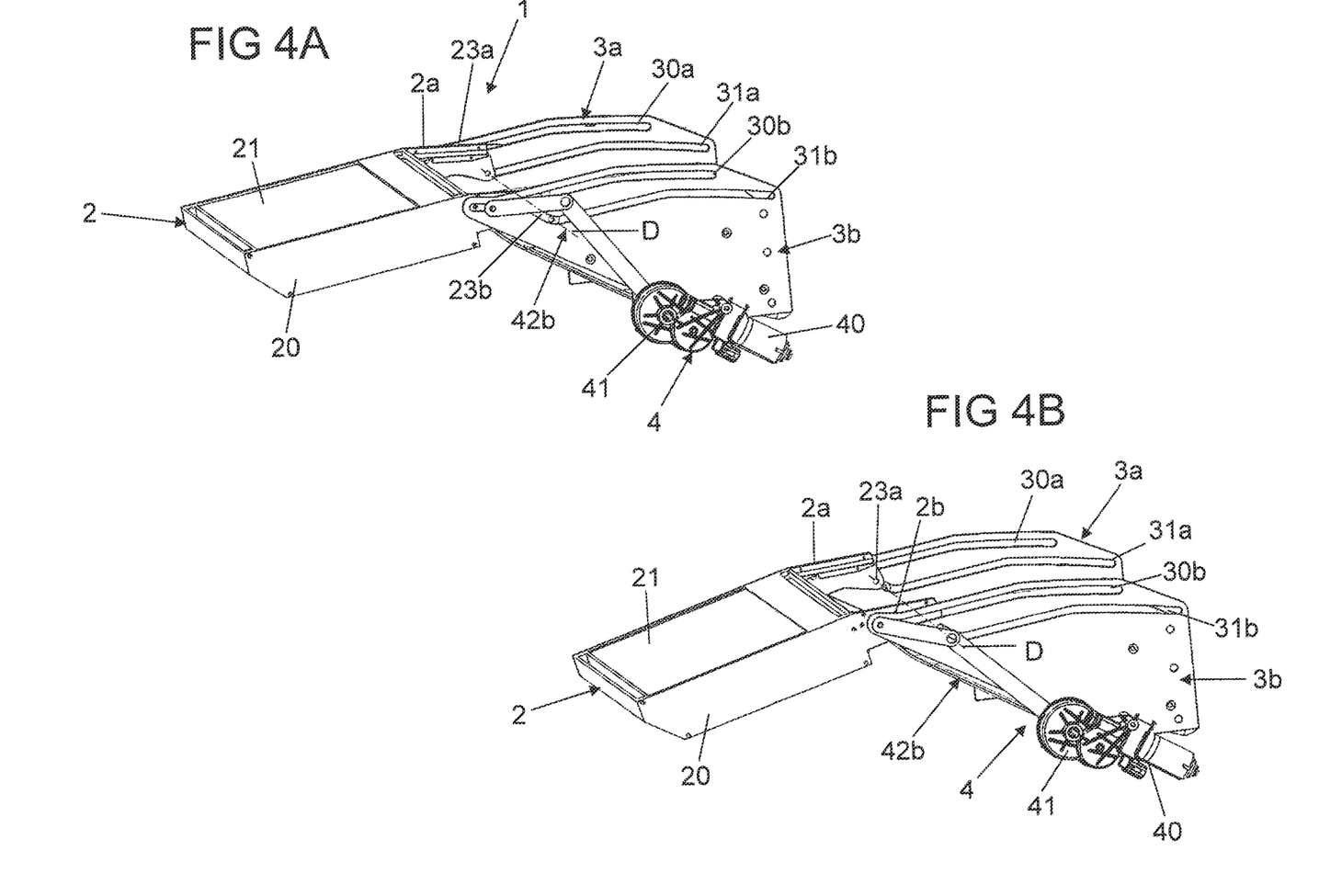
FIGS. 4A-4B shows a perspective view of the storage compartment module with an extended table element in different inclined adjustment positions.
Figure 5A:
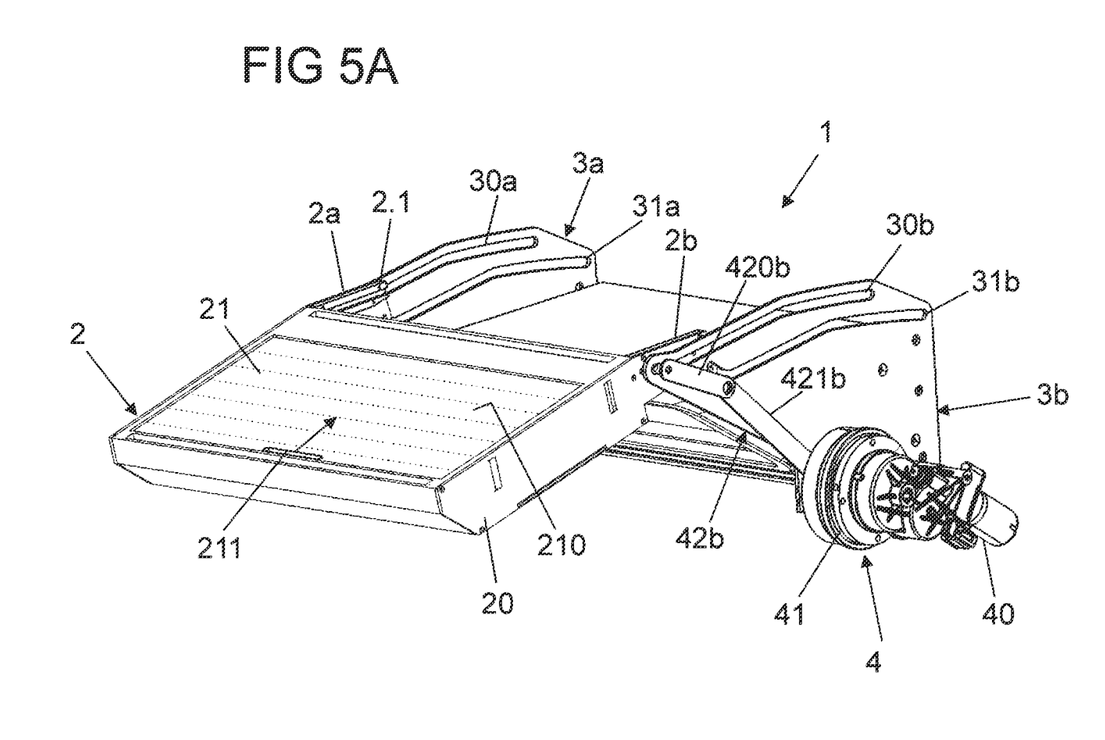
FIGS. 5A-5B show the storage compartment module in a perspective view with an extended table element with a closed and an open cover for providing access to a storage space inside the table element.
Figure 5B:
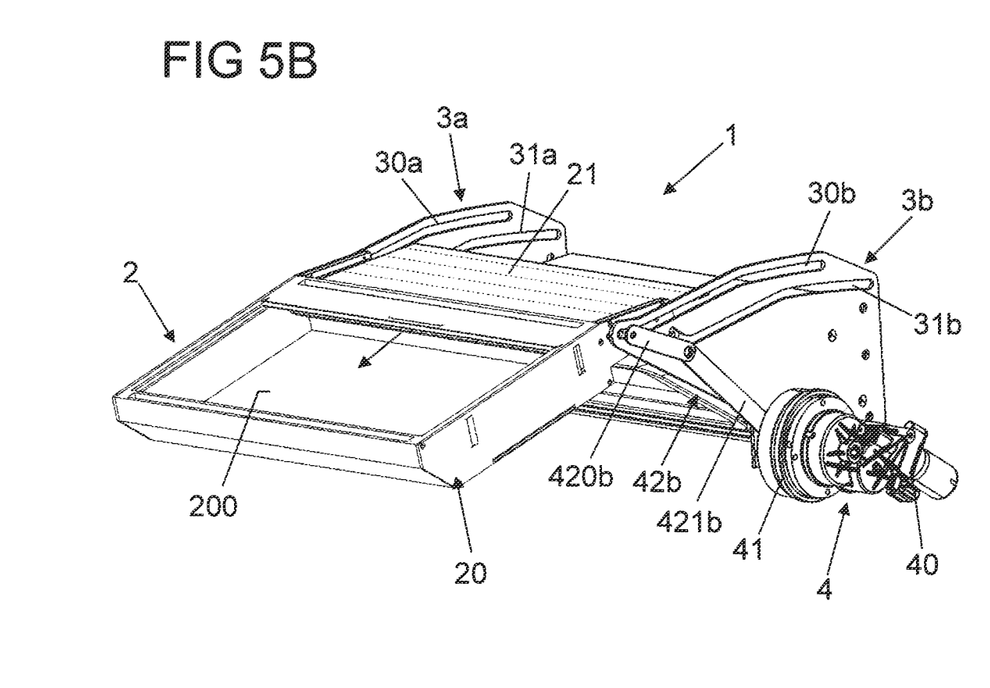

The table element 2 is arranged on two plate-shaped side parts 3a and 3b of the storage compartment module 1 facing each other transversely to the longitudinal axis A and is shiftably held via two pairs of slotted guides 30a/31a or 30b/31b. On each side part 3a, 3b two slotted guides 30a and 31a or 30b and 31b are formed, which are spaced apart from each other and do not extend parallel to each other. In the illustrated design variant, the table element 2 is mounted on these two slotted guides 30a/31a, 30b/31b via guide elements 23a, 23b and 423a, 423b. A guide element in the form of a guide pin 23a, 23b mounted on the table element on each long side of the table element 2 engages into a lower slotted guide 31a or 31b of a side part 3a or 3b, respectively.

The other guide element 423a, 423b, which engages into the upper slotted guide 30a or 30b and is shiftably held therein, is provided at a lever end of a second lever configured as a coupling rod 420a or 420b of a lever mechanism 42a or 42b of the adjustment device 4. Via this guide element 423a, 423b an adjusting force can be introduced for the power-operated adjustment of the table element 2, and the table element 2 consequently can be shifted along an adjustment path specified by the two pairs of slotted guides 30a/31a, 30b/31b.

The lever mechanisms 42a and 42b of the adjustment device 4, which are associated with the two different long sides of the table element 2, are coupled with each other via a drive shaft 44 extending between the two side parts 3a and 3b. This drive shaft 44 can be put into rotation by a motorized (electromotive) drive unit 40 of the adjustment device 4 and a clutch 41 coupled therewith. A first lever end of a pivot lever 421a or 421b of the respective lever mechanism 42a or 42b is non-rotatably connected to the drive shaft 44 so that a pivot lever 421a, 421b also is rotated with each rotation of the drive shaft 44. At a second lever end of each pivot lever 421a, 421b the coupling rod 420a or 420b is articulated via a joint Ga or Gb, which engages the table element 2 via the respective (lever-side) guide element 423a or 423b. Hence, when the drive shaft 44 is rotated by the motorized drive unit 40, the pivot levers 421a and 421b synchronously pivot as well on both long sides of the table element 2 and via the coupling rods 420a, 420b articulated to the pivot levers 421a and 421b drive the table element 2 to perform an adjusting movement along the physical guideway provided by the slotted guides 30a/30b, 31a/31b.

Proceeding from a fully retracted position of the table element 2, a substantially translational adjustment of the table element 2 along the longitudinal axis A initially is specified by the course of the slotted guides 30a/30b, 31a/31b. Hence, when a control or operating signal s1 is present at an electronic control unit SE associated with the adjustment device 4, the motorized drive unit 40 is actuated via a control signal s4 to extend the door element 2 along the longitudinal axis A. Corresponding to the representations of FIGS. 3A to 3D, the table element 2 can be stopped in different adjustment positions so that a user can variably adjust the extent to which the table element 2 is extended. A size of a table surface 210 provided by the door element 2 varies in dependence on the extent to which the table element 2 is extended.

In an extended state of the table element 2, corresponding to the representations of FIGS. 3C-3D and 4A-4B, an inclination of the extended table element 2 can be adjusted by further actuation of the motorized drive unit 40. At the one, lower slotted guide 31a/31b of the two side parts 3a, 3b an angled (slotted guide) end portion 310a, 310b extending obliquely upwards in the direction of the other, upper slotted guide 30a/30b therefor is provided. When the table element 2 driven by the lever mechanisms 42a and 42b along a corresponding (slotted guide) end portion 300a, 300b is shifted along the upper slotted guide 30a, 30b, the guide pin 23a, 23b in the angled end portion 310a, 310b on the side of the table element each slides upwards in the lower slotted guide 31a, 31b and thus leads to a pivotal movement of the extended table element 2 downwards along a pivot direction B. The pivotal movement B here is performed around a pivot axis D which is defined by the two lever-side guide elements 423a and 423b on the mutually opposite slotted guides 30a and 30b.

In the illustrated design variant of the storage compartment module 1, a user in a first phase of an adjustment range of the table element 2—proceeding form a fully retracted (adjustment) position—hence initially can extend the table element 2 chiefly along the longitudinal axis A and thereby variably adjust the size of the table surface 210 to be provided. When the table element 2 is fully extended, the inclination of the table element 2 about the pivot axis D can additionally be adjusted. For example, the table element 2 can be inclined downwards (more strongly) along the pivot direction B.

An inclination of the table element 2 may allow a user to more easily position certain objects on the table surface 210, such as for example a laptop or a tablet. In addition, a greater inclination of the table element 2 in the present case also offers the advantage of an easier accessibility of a storage space 200 which is provided inside the table element 2.

In the present case, the table element 2 is traversable with a storage compartment body 20 on which a cover 21 at least partly forming the table surface 210 is shiftably mounted. In a closed position, this cover 21 forms a flat part of the table surface 210. However, corresponding to the representation of FIGS. 5A and 5B, the cover 21 can also be shifted in order to transfer the cover 21 into an open position via which the storage space 200 of the table element 2 is made accessible. For the manual adjustment of the cover 21, a handle opening 211 is formed on its front side.

For guiding the cover 21 into the open position, a guide web 2.1 (merely visible in FIG. 5A on a left-hand long side) is provided at a rear end, based on a direction of extension of the table element 2, on each long side. On this guide web 2.1 the rearwardly adjusted cover 21 is supported and physically guided.

The guide webs 2.1 are formed on support elements in the form of support plates 2a and 2b. On this support plates 2a and 2b the table-element-side and lever-side guide elements 23a/23b and 423a/423b are fixed in order to adjustably hold the table element 2 at the side parts 3a and 3b.

The design variant of a storage compartment module 1 shown in FIGS. 1 to 5B includes an adjustment device 4 which as an alternative to a power-operated adjustment of the table element 2 also permits a manual adjustment of the table element 2. For a manual adjustability of the table element 2, the drive unit 40 with the clutch 41 can be of a non-self-locking type. Alternatively, the clutch 41 is switchable, for example via a control signal s3 of the electronic control unit SE. In dependence on the presence of the control signal s3 of the electronic control unit SE, the clutch 41 thus can be switched into a clutch state in which the motorized drive unit 40 is disengaged and hence does not counteract a manual adjustment of the table element 2, even if the motorized drive unit 40 and for example, a transmission provided therein is of the self-locking type.

A manual adjustability of the table element 2 can be made possible for example at the request of a user, for example to provide for a faster adjustment of the table element 2. In order to prevent an unintentional change of the adjustment device 4 into another operating state in which a manual adjustability is permitted, it is provided for example to make the generation of the control signal s3 of the electronic control unit SE dependent on the fact that two separate operating signals s5 and s6 are present at the electronic control unit SE. These operating signals s5 and s6 are generated upon actuation of two operating elements 5a and 5b, which are provided on the table element 2, for example on a front side of the table element 2.

The operating elements 5a and 5b for example are sensors which must be touched and/or pressed by a user in order to generate the respective operating signal s5 or s6. When both operating elements 5a and 5b are actuated at the table element 2, the electronic control unit SE generates the control signal s3 and thereby switches the clutch 41 into a clutch state in which the motorized drive unit 40 is disengaged and hence the table element 2 is released for manual adjustment.

Alternatively or in addition to a user-controlled change between the operating states of the adjustment device 4 and hence between a manual adjustability and a power-operated adjustability of the table element 2, an automatic change between the operating states can also be provided. For example, the electronic control unit SE can be configured to receive a control signal s2 of a vehicle-mounted pre-crash sensor system via which a potential crash of the vehicle is indicated. When such a control signal s2 is present at the electronic control unit SE, the control signal s3 for actuating the clutch 41 can be generated in order to provide for a manual adjustment of the table element 2. In this way, the possibly extended table element 2 can be retractable again by application of a comparatively low force. In a crash case, the table element 2 thus is resilient on contact with a user. Thus, the risk of injury by the extended table element 2 is reduced.

Alternatively or in addition, a control signal s4 for actuating the motorized drive unit 40 can be generated in response to a control signal s2 of a vehicle-mounted pre-crash sensor system, which is present at the electronic control unit SE. In the presence of a control signal s2 indicating a potential crash case, the electronic control unit SE correspondingly is configured to actuate the motorized drive unit 40 of the adjustment device 4 via a control signal s4 for retracting the table element 2 into a fully retracted position. The crash-induced retraction of the table element 2 possibly can also be effected at a speed which is distinctly higher than a usual adjustment speed, so that in a crash case the table element 2 is removed as quickly as possible from a potential danger and hence injury zone for a vehicle occupant.

As an alternative to an electronically controllable clutch 41, however, the clutch can also be configured for example as a (mechanically controllable) overload clutch. Via such an overload clutch 41, the motorized drive unit 40 then can be disengaged and hence be decoupled from the lever mechanisms 42a and 42b, when an adjusting force exceeding a threshold value acts on the table element 2. Via such an overload clutch, for example in the form of a slip clutch, it thus is ensured that an excessive adjusting force is not transmitted to the motorized drive unit 40 and the same possibly is damaged thereby. In addition, it can thereby be achieved that in a crash case the table element 2 yields under the influence of a body part of a vehicle occupant and does not remain arrested by the electromotive drive unit 40 (possibly of the self-locking type), when the vehicle occupant bumps against the extended table element 2.

The illustrated configuration of a storage compartment module 1 can also be usable without an electromotive drive unit 40. When the electromotive drive unit 40 is omitted, the storage compartment module 1 of FIGS. 1 to 5B remains fully functional, but the table element 2 then is merely manually adjustable. In this way, different types or versions of adjustment devices 4 can be provided, on the one hand a type/version with a motorized drive unit 40 and on the other hand a type/version without a motorized drive unit 40 for an exclusively manual adjustability of the table element 2.

Figure 6A:
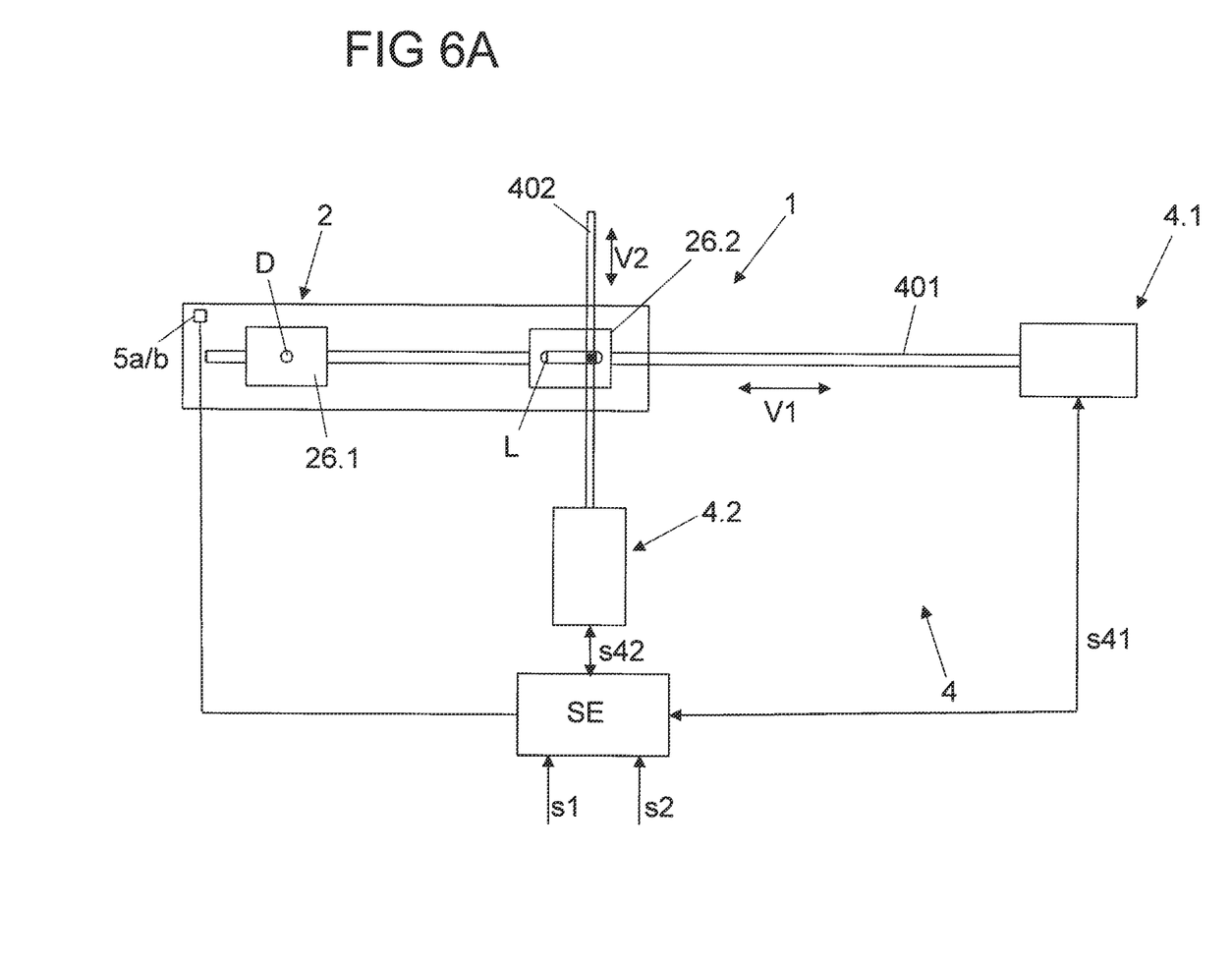
FIGS. 6A-6B schematically show another design variant of a proposed adjustable assembly with two different motorized drive units, which are associated with two superimposed linear guideways.
Figure 6B:
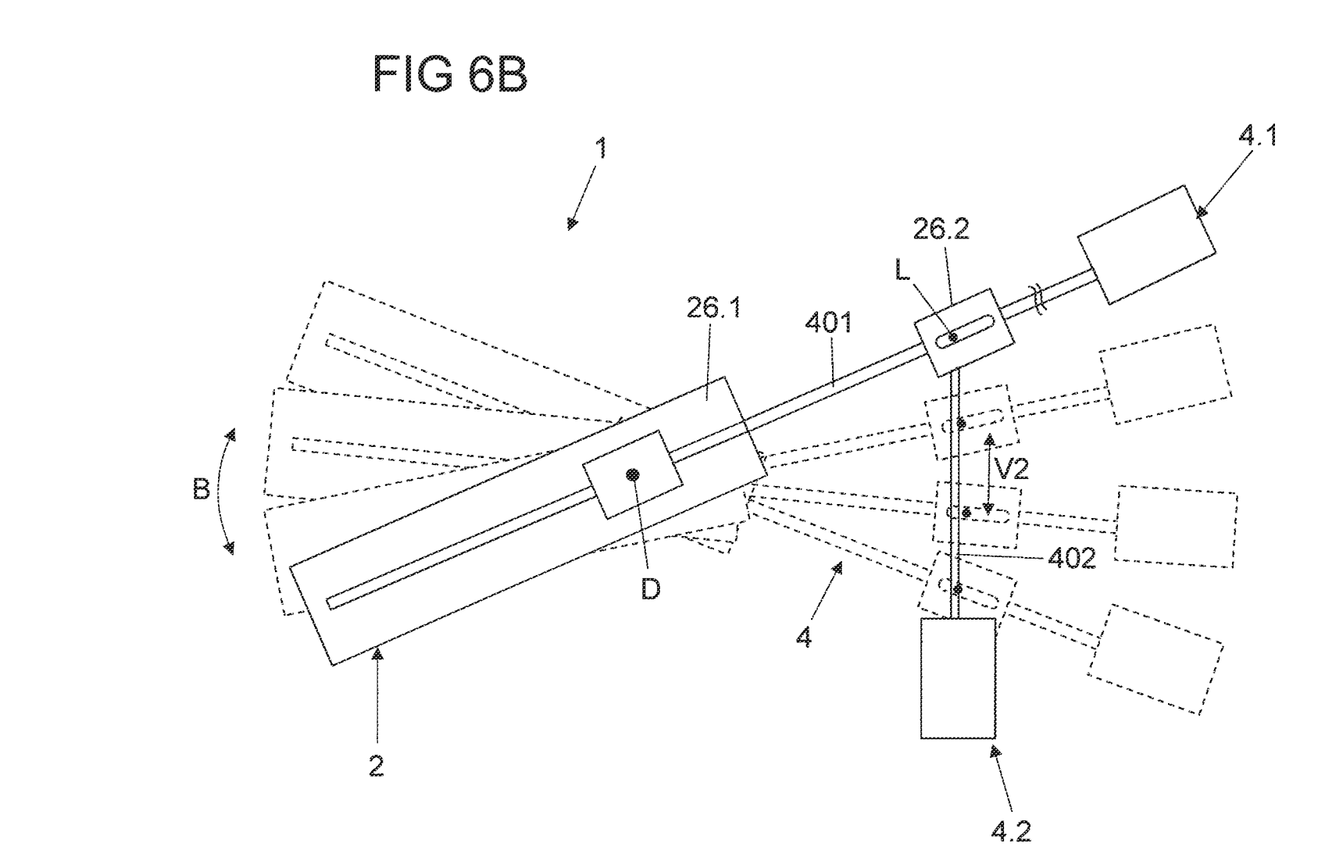

In the design variant of an adjustable assembly of FIGS. 6A and 6B, the adjustable assembly can likewise be configured in the form of a storage compartment module 1. In contrast to the design variant of FIGS. 1 to 5B, the design variant of FIGS. 6A and 6B provides two motorized drive units 4.1 and 4.2, such as electromotive drive units, in order to on the one hand control a power-operated adjustment of the table element 2 along the longitudinal axis A and on the other hand a pivotability of the table element 2 about the pivot axis D in a power-operated way.

The table element 2 is adjustably mounted via two bearing units 26.1 and 26.2 on each long side. Based on an adjustment direction V1 pointing in the direction of the extended position, the one bearing unit 26.1 is located in front of the other bearing unit 26.2. The one, first bearing unit 26.1 here is to be provided with a pivot bearing in order to provide the pivot axis D. By means of the additionally provided motorized drive unit 4.2, the second bearing unit 26.2 is shiftable along the second linear guideway along an adjustment direction V2. Via the one linear guideway, which therefor provides for example a guide rail 401, a spindle or a toothed rack as a physical guideway, the table element 2 hence can be translationally shifted by means of the first motorized drive unit 4.1, i.e. for example linearly along the guide rail 401.

In addition, the second bearing unit 26.2 can be translationally adjusted along the second linear guideway in order to thereby pivot the first linear guideway and in this way also the table element 2 about the pivot axis D of the first bearing unit 26.1. The second bearing unit 26.2 therefor is connected for example to a length compensating device which in the illustrated design variant includes an oblong hole L and includes a gear wheel element, e.g. in the form of a pinion or a spindle nut, which meshes with a longitudinally extended drive element of the second linear guideway, for example in the form of a spindle 402 or a toothed rack. When this drive element 402 is driven by the second motorized drive unit 4.2, the second bearing unit 26.2 is adjusted substantially perpendicularly to the guide rail 401 and hence a torque about the pivot axis D is applied to the table element 2. This axis of rotation D is formed for example by a pivot pin which is rotatably mounted on a side part 3a or 3b of the adjustable assembly and of the storage compartment module 1, respectively.

By using two independently actuatable motorized drive units 4.1 and 4.2, which each are associated with one of two linear guideways, the table element 2 (in an at least partly extended state) in each adjustment position can be adjustable in its inclination about the pivot axis D. In addition, the table element 2 can also be extended on a curved path, depending on the installation space, in that both electromotive drives 4.1 and 4.2 are actuated at the same time according to specified parameters.

Analogous to the design variants explained above, the table element 2 in the design variant of FIGS. 6A and 6B can also be moved manually, if necessary, by disengaging the drive units 4.1 and 4.2—in the case of a self-locking transmission. Instead of disengaging the motorized drive unit 4.1 and 4.2, a non-self-locking transmission can be used, which is held by a brake, if necessary. To move the table element, the brake is released and the table element 2 can be manually shifted correspondingly.

Even in the design variant of FIGS. 6A and 6B, an electronic control unit SE coupled with the electromotive drive units 4.1 and 4.2 furthermore can be used to provide for an adjustment of the table element 2, a change between a power-operated and a manual adjustability and/or a crash-induced actuation of the adjustment device 4. Consequently, the electronic control unit SE here may be configured to actuate the adjustment device 4, for example a clutch and/or one or both motorized drive units 4.1, 4.2 of the adjustment device 4 upon receipt of at least one control signal s2, which indicates a potential crash case. Alternatively or in addition, the electronic control unit SE can be configured to trigger a change of the adjustment device 4 from a first operating state to a second operating state upon receipt of at least one operating signal s5, s6, which is generated by actuation of an operating element 5a, 5b.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1 storage compartment module (adjustable assembly)
2 table element
2.1 guide web
20 storage compartment body
200 storage space
21 cover
210 table surface
211 handle opening
23a, 23b guide pin (guide element)
26.1, 26.2 bearing unit
2a, 2b support plate (support element)
300a, 300b end portion
30a, 30b, 31a, 31b slotted guide
310a, 310b end portion
3a, 3b side part
4 adjustment device
4.1, 4.2 drive unit
40 drive unit
401 guide rail (guideway)
402 spindle/toothed rack (drive element)
41 clutch
420a, 420b coupling rod (2nd lever)
421a, 421b pivot lever (1st lever)
423a, 423b guide element
42a, 42b lever mechanism
44 drive shaft
5a, 5b operating element
A longitudinal axis
B pivot direction
D pivot axis
Ga, Gb joint
L oblong hole (length compensating device)
s1-s6 signal
s41, s42 signal
SE electronic control unit
V1, V2 adjustment direction While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. An adjustable assembly for use in a vehicle, the adjustable assembly comprising:
    a table element forming a table surface configured to support an object; and
    an adjustment device configured to provide power-operated adjustment to the table element to adjust a size of the table surface by moving the table element along a longitudinal axis, extending substantially parallel to the table surface, between a fully retracted position and a fully extended position, and to adjust an inclination of the table element in a fully extended position by pivoting the table element about a pivot axis extending substantially perpendicularly to the longitudinal axis.

2. The adjustable assembly of claim 1, wherein the adjustment device includes a physical guideway configured to guide the table element along the longitudinal axis.

3. The adjustable assembly of claim 2, wherein the physical guideway is formed by a slotted guide and/or a guide rail.

4. The adjustable assembly of claim 1, further comprising:
    an adjustable cover, wherein the adjustable cover at least partially defines the table surface and is configured to be adjusted between a closed position and an open position in which so that a storage space formed by the table element is accessible.

5. The adjustable assembly of claim 1, wherein the adjustment device is configured to be actuated to manually adjust the table element.

6. The adjustable assembly of claim 1, wherein the adjustment device includes a first motorized drive unit.

7. The adjustable assembly of claim 6, wherein the adjustment device includes a second motorized drive unit, wherein the first motorized drive unit is configured to adjust the table element along the longitudinal axis, and the second motorized drive unit is configured to pivot the table element about the pivot axis.

8. The adjustable assembly of claim 7, wherein the adjustment device includes a first linear guideway and a second linear guideway, and the first motorized drive unit is configured to move the table element along the first linear guideway and the second motorized drive unit is configured to move the table element along the second linear guideway.

9. The adjustable assembly of claim 8, further comprising:
    a first bearing unit configured to support the table element and move along the first linear guideway; and a second bearing unit configured so that the first linear guideway is shiftable along the second linear guideway.

10. The adjustable assembly of claim 9, wherein adjusting the second bearing unit along the second linear guideway pivots the table element about the pivot axis and wherein the pivot axis is defined by the first bearing unit.

11. The adjustable assembly of claim 8, wherein at least one of the first or second linear guideways includes a toothed rack, a spindle and/or a guide rail.

12. The adjustable assembly of claim 1, wherein the adjustment device includes a lever mechanism configured to adjust the table element.

13. The adjustable assembly of claim 12, wherein the lever mechanism includes two levers each configured to articulate with respect to one another and transmit an adjusting force, generated by a motor of the adjustment device.

14. The adjustable assembly of claim 13, further comprising:
a first guide element disposed on a first lever of the two levers; and
a first slotted guide connected to the table element, wherein the first guide element is configured to shift along the slotted guide.

15. The adjustable assembly of claim 14, further comprising:
a second guide element disposed on a second lever of the two levers; and
a second slotted guide connected to the table element and spaced apart from the first slotted guide, wherein the second guide element is configured to shift along the second slotted guide.

16. The adjustable assembly of claim 15, wherein either the first slotted guide or the second slotted guide form an adjustment path so that as the first guide element or the second guide element moves along the adjustment path, the table element pivots about the pivot axis.

17. The adjustable assembly of claim 15, further comprising:
a first side part defining the first slotted guide; and
a second side part defining the second slotted guide, wherein the first side part faces the second side part and when the table element is in a retracted position, the table element is disposed between the first side part and the second side part.

18. An adjustable assembly for use in a vehicle, the adjustable assembly comprising:
a table element forming a table surface configured to support an object; and
an adjustment device configured to provide power-operated adjustment to the table element to move the table element along a longitudinal axis, extending substantially parallel to the table surface, between a retracted position and an extended position, and to pivot the table element about a pivot axis extending substantially perpendicularly to the longitudinal axis, the adjustment device including:
wherein the adjustment device includes a motorized drive unit and clutch configured to disengage the motorized drive unit so that the table element is manually adjustable.

19. An adjustable assembly for use in a vehicle, the adjustable assembly comprising:
a table element forming a table surface configured to support an object; and
an adjustment device configured to provide power-operated adjustment to the table element to move the table element along a longitudinal axis, extending substantially parallel to the table surface, between a retracted position and an extended position, and to pivot the table element about a pivot axis extending substantially perpendicularly to the longitudinal axis; and
an operating element configured to be to be actuated by a user to change an operating state of the adjustment device from a first operating state to a second operating state and, wherein when the adjustment device is in the first operating state, the adjustment device provides the power-operated adjustment to the table element, and when the adjustment device is in the second operating state, the table element is manually adjustable.

* * * * *